Aug. 24, 1943.  E. J. HABER  2,327,886
APPARATUS FOR SEPARATING DUST AND OTHER SUSPENDED
MATTER FROM AIR AND OTHER GASES OR VAPORS
Filed Sept. 14, 1940
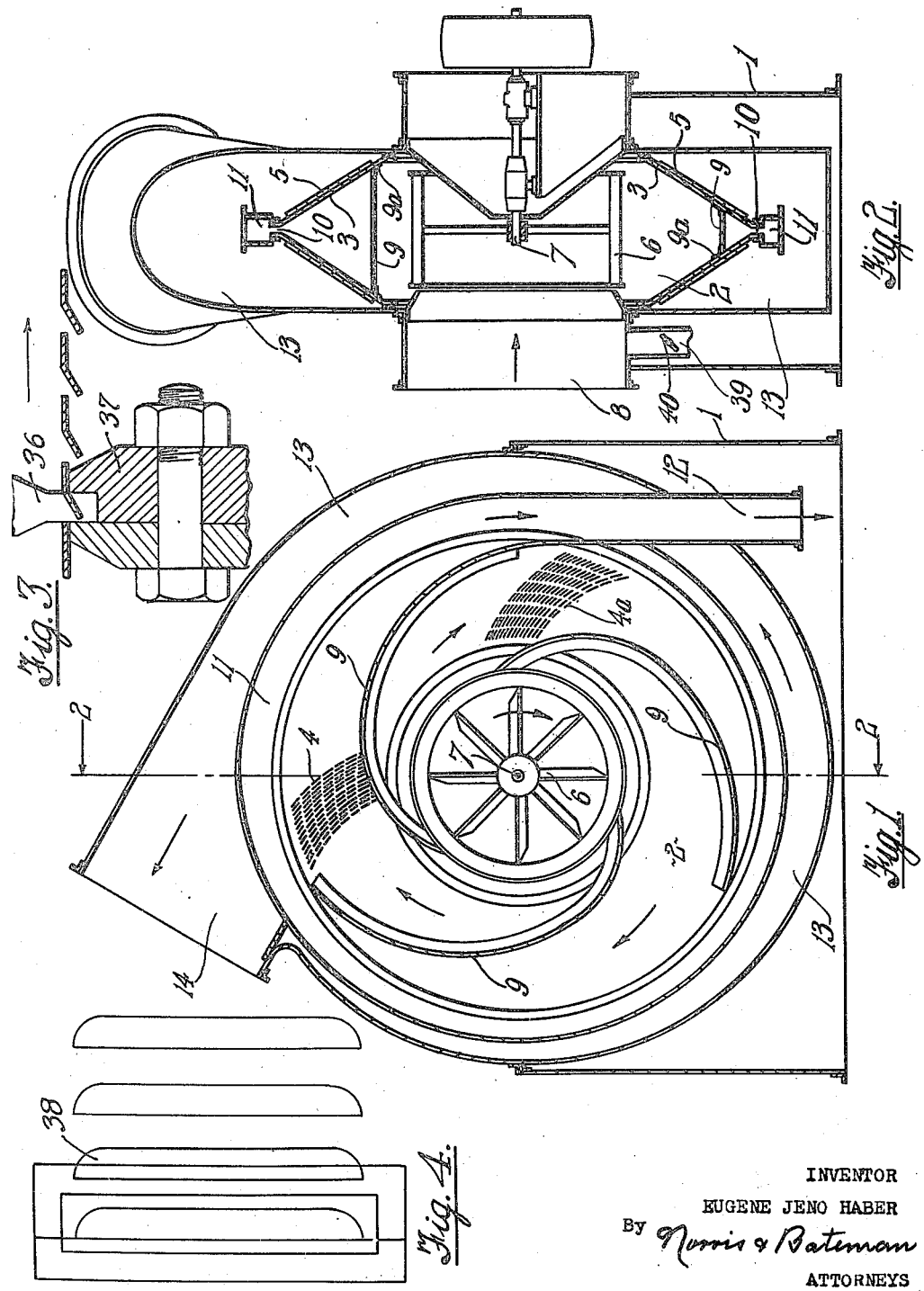
INVENTOR
EUGENE JENO HABER
By Norris & Bateman
ATTORNEYS Patented Aug. 24, 1943

2,327,886

UNITED STATES PATENT OFFICE 2,327,886

APPARATUS FOR SEPARATING DUST AND OTHER SUSPENDED MATTER FROM AIR AND OTHER GASES OR VAPORS

Eugene Jenö Haber, Sanderstead, England, assignor to Matthews & Yates Limited, Swinton, Manchester, England Application September 14, 1940, Serial No. 356,868
In Great Britain July 14, 1939

7 Claims. (Cl. 183—80)

This invention relates to apparatus for separating heavy gases from light gases, dust and other suspended matter from air, steam or other gas or vapour, e. g. for separating sulphur gases or other heavy gases or suspended matter from flue gases or dust from air and the object of the invention is to provide improved constructions or arrangements of separators which are compact, of a high efficiency, capable of easy manufacture and in which parts liable to erosion can be easily and cheaply replaced.

According to the invention apparatus for separating gases of different densities or for separating suspended matter from air, steam or other gas or vapour is provided wherein the gas or vapour to be treated is caused to flow over the surfaces of cooperating partitions or diaphragms each provided with a large number of small openings, the partitions or diaphragms being of annular shape and forming a separating wall between an annular separating chamber for the gas or vapour to be treated and an annular receiving chamber for clean gas or vapour.

In order to promote the separation of heavy gases from light gases or suspended matter from gas or vapour which passes through the openings in the said partition or diaphragm, the latter is preferably constructed so that the surface areas between the openings on the side facing the parent stream form parts of a continuous surface and means is provided for maintaining the gas or vapour on that side of the partition in motion in a direction substantially parallel with the said surfaces.

Reference will now be made to the accompanying drawing which illustrates diagrammatically and by way of example, constructions according to the invention and in which:

Fig. 1 is a sectional elevation of a rotary type of separator,

Fig. 2 is a sectional elevation taken on the line 2—2 of Fig. 1,

Fig. 3 is a detail showing the method of forming the slots in the diaphragms, and Fig. 4 is a view showing the preferred formation of the slots.

In the form of the invention shown in Figs. 1 and 2, the apparatus consists of an outer casing 1 within which is a separating chamber 2 formed by means of two partitions or diaphragms 3, each having a number of openings 4 formed as hereinafter described with the pressed out portions 5 acting as louvres for deflecting the gas or vapour and changing its direction of motion.

Each diaphragm 3 is of frusto-conical shape as shown in Fig. 2, the said diaphragms being mounted co-axially so as to form between them the annular separating chamber 2 of substantially triangular cross section. A rotary impeller 6 is mounted concentrically within the chamber 2 on a shaft 7 so as to deliver tangentially into the said chamber and thus to impart a rapid rotary motion to the gas or vapour. The impeller 6 is arranged to draw in the gas or vapour for treatment axially through a suction opening 8 disposed at one side of the casing 1.

The flow of gas or vapour within the separating chamber 2 is controlled by means of scroll-shaped deflecting plates 9 the edges of which, where they make contact with the inner walls as the diaphragms are sealed in this form of construction by means of angle members, indicated at 9a in Figs. 1 and 2, which prevent escape of concentrated dust through the adjacent openings in the diaphragm into the clean gas side. The plates 9 extend spirally around the chamber 2 and thus form inner volutes for receiving the gas or vapour from the impeller 6 and outer volute passages for delivering the dirty gas or vapour through a narrow peripheral opening 10 by which the separating chamber 2 communicates with a receiving chamber 11 for dirty gas or vapour. The said receiving chamber 11 is of volute form and communicates with a tangential delivery conduit 12 from which the dirty gas or vapour with the dust or other matter suspended therein is carried away to any desired point and for this purpose the clean air outlet 14 may be provided with a damper or throttle for adjusting the pressure inside the separating chamber 2 to increase as required the available pressure head in the conduit 12 so that the separated heavy gases, dust or other suspended matter may be conveyed pneumatically to a remote point without the need for a further blower to effect the conveyance.

The conduit 12 may discharge into a settling chamber adjacent to or remote from the apparatus from which the dirty gas or vapour may be discharged to atmosphere of a portion or the whole of it may be recirculated through the apparatus after it has been freed from a portion of its dust content by settling, and for the purposes of recirculation a conduit 39 may be provided between the settling chamber and the inlet 8 to the apparatus. The recirculating conduit 39 may be provided with a damper or throttle 40 to regulate the quantity of gases recirculated.

It will be noted that because the separating chamber 2 is of triangular section, the cross section of the outer volute formed by the scroll-shaped deflecting plates 9, as aforesaid, progressively diminishes along the path of the gas or vapour not only by reason of the spiral shape of the scrolls but also by reason of the fact that the separating chamber gradually becomes narrower towards the periphery thereof. Instead of employing three deflecting plates 9 as shown, they may be replaced by a single scroll shaped plate or by any other desired number.

The separating chamber 2 and the volute chamber 11 for receiving the dirty gas or vapour as aforesaid are enclosed within a further volute chamber 13 into which the clean gas or vapour is received through the openings 4 and from which the clean gas or vapour is delivered through a tangential outlet 14 to a conduit leading to any desired point.

The partitions or diaphragms 3 having the openings 4 for the passage of clean gas or vapour may be made of sheet metal and the openings may be pressed out therefrom, the pressed-out parts 5 being formed on the clean gas side of the diaphragm and being set either at right angles to the diaphragm or at an acute angle thereto. These pressed-out portions are arranged on the forward sides of the slots in relation to the direction of motion (indicated by the arrows in Fig. 1) of the dirty gas or vapour so that the gas or vapour which passes through the slots impinges against the pressed-out portions 5 and is deflected thereby. This causes a reversal of the direction of rotation of the gas or vapour after it has passed through the slots and the volutes hereinafter described are arranged accordingly, the outer volute chamber 11 being of a progressively increasing area in a direction opposite to the inner volutes formed by the plates 9.

One of the advantages of this form of construction is that during the passage of the gases through the separating chamber, the separation of the dust or heavy gases in the manner described is assisted by centrifugal force arising from the rotary motion of the said gases and suspended matter which promotes the collection and retention of the suspended particles and heavier gases by the receiving chamber 11. In this form of construction, the advantages of both the impact and centrifugal types of separator are thus incorporated in the one apparatus.

The openings 4 in the diaphragm are preferably in the form of elongated slots, as shown, each of which extends in the direction shown at 4 or in the reverse direction shown at 4a. The slots are, therefore, inclined somewhat to the radial direction since the stream of gas or vapour has an outward radial component of motion in addition to the rotation imparted by the impeller.

The preferred method of forming the slots in the diaphragms is illustrated in Figs. 3 and 4 of the drawing. Fig. 3 shows the movable and stationary die members 36 and 37 which are used to form the slots and deflector plates. The shape of the portions pressed out is shown in Fig. 4 and in order to prevent the escape of gas around the pressed-out parts at the end of the slots, the material of the diaphragm is slit along one long side only and not across the ends so that the ends 38 of the pressed-out parts form cowl-like portions.

I claim:

1. A separating apparatus comprising an annular separating chamber for the gas or vapour to be treated, an annular receiving chamber for the clean gas or vapour, a plurality of cooperating annular coned diaphragms forming separating walls between said chambers, and a large number of small openings formed in said diaphragms, means for causing the gas or vapour to undergo a rotary movement in said receiving chamber, means operably associated with said openings for causing the gas or vapour to undergo an abrupt change in direction as it passes therethrough, and an annular receiving chamber for the dirty gas or vapour surrounding the peripheries of said diaphragms and into which the dirty gas or vapour enters after the clean gas or vapour has passed through the said openings.

2. A separating apparatus according to claim 1, wherein the surface areas between the openings on the side of each diaphragm facing the parent stream of gas form parts of a continuous surface, and means are provided to maintain the flow of gas on that side of the diaphragm in motion in a direction substantially parallel with the said surfaces.

3. A separating apparatus comprising a casing, a pair of annular diaphragms in said casing converging towards their outer edges, and dividing said casing into a parent gas chamber and a clean gas chamber, a plurality of slots in each of said diaphragms formed by pressed out portions which project on the clean gas sides of the diaphragm and cause the gas as it passes therethrough to undergo an abrupt change of direction, a central inlet in said parent gas chamber for dirty gas, an outlet for dirty gas between the outer edges of said diaphragms, and an annular outlet conduit located at the outer edges of said diaphragms and communicating with said outlet.

4. In a separating apparatus, a casing, a pair of diaphragms of truncated conical shape coaxially mounted in said casing in facing relationship, with their bases in spaced apart relationship to provide a parent gas chamber of annular shape having a peripheral annular outlet, a dirty gas chamber of annular shape surrounding the peripheries of said diaphragms and disposed in fluid communication with said outlet, the casing exteriorly of said diaphragms defining a clean gas chamber, a plurality of openings in said diaphragms, and means for causing the gas in said parent gas chamber to circulate and discharge clean gas through said openings into said clean gas chamber.

5. In a separating apparatus, a casing having therein two coned diaphragms forming a parent gas chamber between them, a dirty gas receiving chamber surrounding said diaphragms, and a clean gas receiving chamber enclosing said diaphragms and dirty gas receiving chamber, a plurality of openings in said diaphragms having cowl-like portions projecting toward said clean gas chamber, each of said openings being formed by making a single slit and pressing out the material at one side of the slit to provide an opening whose area decreases to zero at each end of the slit, and means for causing gas in the parent chamber to move substantially parallel to the surfaces of said diaphragms in a direction opposite to said cowl-like portions, for effecting centrifugal separation of solids as the gas passes through said openings and undergoes an abrupt change in direction.

6. In a separating apparatus, a casing, a pair of diaphragms of truncated conical shape coaxially mounted in said casing in facing relationship, with their bases in spaced apart relationship to provide a parent gas chamber of annular shape having a peripheral annular outlet, a plurality of scroll plates disposed in said parent gas chamber and sealed at their edges by said diaphragms, each plate being of volute form for directing the gas circularly and outwardly, a dirty gas chamber of annular shape surrounding the peripheries of said diaphragms and disposed in fluid communication with said outlet, the casing exteriorly of said diaphragms defining a clean gas chamber, a plurality of openings in said diaphragms, and means for causing the gas in said parent gas chamber to circulate and discharge clean gas through said openings into said clean gas chamber.

7. In separating apparatus, a casing, a pair of diaphragms of truncated conical shape coaxially mounted in said casing in facing relationship, with their bases in spaced apart relationship to provide a parent gas chamber of annular shape having a peripheral annular outlet, a dirty gas chamber of annular shape surrounding the peripheries of said diaphragms and disposed in fluid communication with said outlet, the casing exteriorly of said diaphragms defining a clean gas chamber, said clean gas chamber being provided with a tangentially directed discharge portion and said dirty gas chamber being provided with a tangential discharge portion extending in the opposite direction from said clean gas discharge portion, a plurality of openings in said diaphragms, and means for causing the gas in said parent gas chamber to circulate and discharge clean gas through said openings into said clean gas chamber.

EUGENE JENÖ HABER.